9794X
P. F. Perry,
Cook Stove.
Patented June 28. 1836.
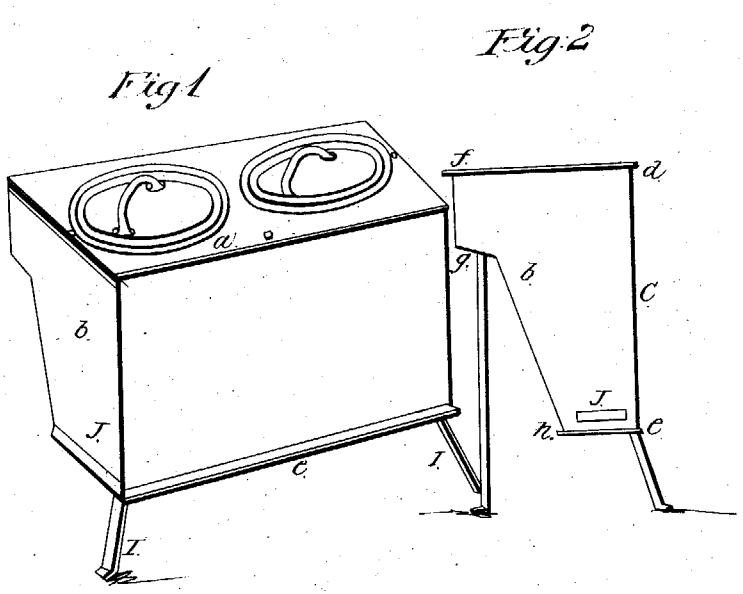

9794X

June 28, 1836

S. F. Perry, of Rockingham, Vermont.
Letters Patent.

The schedule referred to in these Letters Patent and making part of the same containing a
description in the words of the said S. F. Perry himself of his "improvement in the Cooking
Stove": -

---

To all to whom these presents shall come; Be it known that I, S. F. Perry of Rock-
ingham, in the County of Windham and State of Vermont have invented a new and
useful improvement in the useful arts called Perry's portable furnace Stove and that
the following is a full and exact description thereof reference being had to the annexed
drawings: Fig. I. is a perspective view of the machine or Stove which consists of
seven plates of cast iron as follows viz: The top a is one foot ten inches long by
eleven wide, with two holes through it nine inches in diameter which are covered
with rims of different sizes and round plates in the centres: this plate having a groove
around the edge in the under side to receive the back front and end plates.
Fig. II, is a sectional view or end view of the stove which is eight inches wide from the
angle b to c the front: and one foot high from d to e on the front, and four inches
deep on the back from f to g, and five inches wide across the bottom from e to h, both
ends being alike with grooves in the inside at the back and front edges to receive
the back and front plates, the front plate being of sheet iron - -
The bottom should be made sufficiently wide and long to receive the back front
and ends in grooves around its edge and to project three fourths of an inch be-
yond the front plate de e, . .
The legs II are inserted in to the bottom by means of projections of such form as
to receive a dove tail on one end of the leg. The back is made whole with the
different angles represented in the drawing from h to f and sufficiently large to fil
the top bottom and ends, inside of the Stove, Two inches and a half above the bottom
a grate or plate of cast iron with holes through it is placed on projections on the
ends and back on which the fuel is placed to burn't.
J is an opening or damper at each end of the stove to addmit fresh air and
create a draft. The stove is divided into two parts by a partition running perpen-
dicularly from the centre of the grate in front to the top plate a, and from the 9794X June 28, 1836 front to the back. The whole is confined together by means of rods or long bolts running from top to bottom through the inside of of the stove the bolts having nuts at the lower end. The flue is inserted into the back near the top of the stove. for the purpose of broiling, boiling or frying the top of the stove should be made use of, having a fire in one or both of the appartments as the case may require. —
For baking the common double reflecting baker is made use of, which is set against the front of the stove, and receives the necessary heat from the front plate.. It is intended that the dimensions and proportions of the stove may be varied to suit the view and purposes of the constructor, and also the material of which it is made.
—What I claim as my own invention and not previously known is.
1st the form or construction of the mane body of the stove as above described.
2d the application of the same in connection with the com=on double reflecting baker to the purpose of baking.

—Witnesses
Ezekiel Osgood }
Geo. Perry }

N. F. Perry

Drawing

[7]31 [illegible]